(12) United States Patent
Grigorians-Sohruli et al.

(10) Patent No.: US 11,613,296 B2
(45) Date of Patent: Mar. 28, 2023

(54) LATCHING DEVICE, STEERING APPARATUS HAVING SUCH A LATCHING DEVICE, AND METHOD FOR PRODUCING AN INTERLOCKING LATCHING CONNECTION WITH SUCH A LATCHING DEVICE

(71) Applicant: ZF Automotive Germany GmbH, Alfdorf (DE)

(72) Inventors: Goriun Grigorians-Sohruli, Meerbusch (DE); Richard Büker, Willich (DE)

(73) Assignee: ZF Automotive Germany GmbH, Alfdorf (DE)

( * ) Notice: Subject to any disclaimer, the term of this patent is extended or adjusted under 35 U.S.C. 154(b) by 0 days.

(21) Appl. No.: 17/474,559

(22) Filed: Sep. 14, 2021

(65) Prior Publication Data
US 2022/0081021 A1 Mar. 17, 2022

(30) Foreign Application Priority Data
Sep. 15, 2020 (DE) .......................... 102020211564.8

(51) Int. Cl.
*B62D 1/184* (2006.01)
*B62D 1/187* (2006.01)

(52) U.S. Cl.
CPC ............. *B62D 1/184* (2013.01); *B62D 1/187* (2013.01)

(58) Field of Classification Search
CPC ................................ B62D 1/184; B62D 1/187
See application file for complete search history.

(56) References Cited

U.S. PATENT DOCUMENTS

| | | | | |
|---|---|---|---|---|
| 5,657,668 A * | 8/1997 | Hibino | ................ | B62D 1/184 74/495 |
| 5,893,676 A * | 4/1999 | Yamamoto | ............ | B62D 1/184 403/321 |
| 7,083,197 B2 * | 8/2006 | Lutz | ..................... | B62D 1/184 403/321 |
| 9,845,104 B2 * | 12/2017 | Hong | ..................... | B62D 1/187 |
| 11,345,389 B2 * | 5/2022 | Buzzard | ................ | B62D 1/189 |
| 2004/0057786 A1 * | 3/2004 | Heiml | .................. | B62D 1/195 403/373 |
| 2014/0076092 A1 * | 3/2014 | Kwon | ................... | B62D 1/184 74/493 |
| 2014/0331810 A1 * | 11/2014 | Okano | .................. | B62D 1/187 74/493 |

FOREIGN PATENT DOCUMENTS

| | | | | |
|---|---|---|---|---|
| DE | 102019200150 A1 * | 7/2020 | ............ | B62D 1/184 |
| JP | 2018103875 A * | 7/2018 | ............ | B62D 1/184 |

* cited by examiner

*Primary Examiner* — Drew J Brown
(74) *Attorney, Agent, or Firm* — Kristin L. Murphy

(57) ABSTRACT

The disclosure relates to a latching device having a first latching unit and having at least one second latching unit, wherein first teeth of the first latching unit are formed in order to realize an interlocking latching connection with second teeth of the second latching unit, and the first teeth of the first latching unit have a first tooth tip in each case, wherein the first tooth tip forms a first tooth ridge extending in a longitudinal direction of the first tooth. In order to reliably resolve a tooth-on-tooth situation and to be able to realize the desired interlocking latching connection, wherein the first tooth ridge is designed to be curved at least in portions.

18 Claims, 11 Drawing Sheets

LATCHING DEVICE, STEERING APPARATUS HAVING SUCH A LATCHING DEVICE, AND METHOD FOR PRODUCING AN INTERLOCKING LATCHING CONNECTION WITH SUCH A LATCHING DEVICE

CROSS-REFERENCE TO RELATED APPLICATION

This application claims priority to German Patent Application No. 102020211564.8 filed Sep. 15, 2020, the disclosure of which is incorporated herein by reference in its entirety.

TECHNICAL FIELD

The disclosure relates to a latching device having a first latching unit and having at least one second latching unit, wherein first teeth of the first latching unit are formed in order to realize an interlocking latching connection with second teeth of the second latching unit, and the first teeth of the first latching unit have a first tooth tip in each case, wherein the first tooth tip forms a first tooth ridge extending in the longitudinal direction of the first tooth. The disclosure also relates to a steering apparatus for a vehicle and having a steering column, the steering column being arranged and adjustable on a bracket, and the bracket having an aforementioned latching device. The disclosure also relates to a method for producing an interlocking latching connection with a latching device mentioned above, wherein the first latching unit and the second latching unit are moved towards one another with the first teeth of the first latching unit and second teeth of the second latching unit facing one another.

BACKGROUND

Latching devices, steering apparatuses incorporating latching devices, and/or methods of using such latching devices is generally known from EP 3 172 114 B1.

An inclination, height, and/or length of a steering column of a steering apparatus can be adjusted by an adjustable bracket. As a result, a position of a steering wheel arranged on the steering column can be adapted to the requirements of a user or driver. The latching device can be used for locking or latching the desired position of the steering column. In this case, teeth of a first latching unit and a second latching unit engage with one another in an interlocking manner.

However, there is the possibility that, in a desired position of the steering column, first tooth tips of the first teeth come to rest on second tooth tips of the second teeth. In such a tooth-on-tooth situation, the teeth of the first latching unit and the second latching unit cannot directly engage into one another. Instead, there is a risk that, in the tooth-on-tooth situation, the first teeth of the first latching unit will not engage into the second teeth of the second latching unit. This can prevent the effective locking or latching of the steering column in the desired position, in particular by an interlocking latching connection between the first teeth and the second teeth. Furthermore, there is a risk of damage to the tooth tips if the driver or user exerts too much force in order to force a locking or latching in the tooth-on-tooth situation. Alternatively, there is the risk that the driver will have to actuate an adjustment mechanism for adjusting the steering column again and find a slightly different setting in order to avoid a tooth-on-tooth situation.

What is needed is to further develop a latching device, a steering apparatus, and/or a method of the type mentioned above in such a way that a tooth-on-tooth situation can be reliably resolved and the desired interlocking latching connection can be realized. In particular, an alternative arrangement is to be provided herein.

SUMMARY

The disclosure is directed to a latching device with a steering apparatus, and/or a method. Exemplary arrangements of the disclosure may be found in the following description.

A latching device has a first latching unit with first teeth and at least one second latching unit with second teeth. The first teeth and the second teeth are designed to interact with one another and to form an interlocking latching connection between the first latching unit and the second latching unit. Depending on the specific design of the latching device, the latching device can have a third latching unit or further latching units. In one exemplary arrangement, the first latching unit interacts with the second latching unit, the third latching unit, and/or further latching units. The first teeth of the first latching unit have a first tooth tip in each case. In particular, the first teeth have one single tooth tip in each case. This first tooth tip forms a first tooth ridge extending in a longitudinal direction of the first tooth. In one exemplary arrangement, the first teeth of the first latching unit and the second teeth of the second latching unit form a row of teeth in each case. In one exemplary arrangement, the row of teeth extends transversely or at right angles to the longitudinal direction of the first tooth and/or second tooth in each case. The row of teeth of the first latching unit is formed by a plurality of first teeth and the row of teeth of the second latching unit is formed by a plurality of second teeth. According to the disclosure, the first tooth ridge is designed to be curved at least in portions.

An advantage in this case is that due to the at least partially curved first tooth ridge in a tooth-on-tooth situation, only one sub-portion of the first tooth ridge abuts or rests against a second tooth tip of the second tooth or against a sub-portion of a second tooth ridge of the second tooth. In this way, a design of the latching device can be implemented which allows the tooth-on-tooth situation to be resolved.

In one exemplary arrangement, the first tooth ridge is designed to be curved in a direction transverse or at right angles to the longitudinal direction of the first tooth. The first tooth ridge can be designed to be curved over its entire length in the longitudinal direction of the first tooth. In particular, the first tooth ridge has a curved portion and a straight portion. The curved first tooth ridge or the curved portion of the first tooth ridge can have a constant radius or a changing radius. In one exemplary arrangement, the first tooth has two tooth flanks facing away from one another. In particular, the tooth flanks have a flank height in each case which, starting from a tooth base of the first tooth, extends over the surface of the respective tooth flank up to the first tooth tip or up to the first tooth ridge. In one exemplary arrangement, the flank height is aligned at right angles to a tooth end on the face.

A continuous increase in a first flank height of a first tooth flank of the first tooth can be produced starting from a first tooth end of the first tooth, due to the tooth ridge curved in the direction of a second tooth end facing away from the first tooth end. Correspondingly, for a second tooth flank of the first tooth, starting from the first tooth end in a direction of the second tooth end, there is a continuous reduction in the second flank height of the second tooth flank. If the first tooth ridge has a straight portion adjoining the curved portion, the flank heights in the region of the straight portion remain constant.

According to a further exemplary arrangement, the first tooth ridge has a continuously, decreasing tooth height at least in portions in the longitudinal direction of the first tooth and starting from a first tooth end of the first tooth in the direction of a second tooth end of the first tooth facing away from the first tooth end. A continuously decreasing tooth height can result over the entire length of the first tooth ridge in the longitudinal direction of the first tooth. In one exemplary arrangement, the first tooth ridge has a first sub-portion having a continuously decreasing tooth height and a further portion having a constant tooth height. In one exemplary arrangement, the continuously decreasing tooth height is limited to a curved portion of the first tooth ridge. In one exemplary arrangement, a straight portion of the first tooth ridge has a constant tooth height. Thus, starting from a first tooth end in the direction of a second tooth end, the first tooth can have both a first tooth ridge that changes in terms of its shape and/or its course and also a changing tooth height. For example, in a tooth-on-tooth situation, this can prevent the entire first tooth ridge from abutting or coming to rest on the second tooth ridge of the second tooth. This makes it much easier to resolve the tooth-on-tooth situation. The first tooth end and/or the second tooth end can have an end face. In one exemplary arrangement, the end faces of the first tooth end and the second tooth end face away from one another. End faces of the first tooth end and the second tooth end can be aligned parallel or inclined to one another. In one exemplary arrangement, when the end faces of the respective first tooth are aligned inclined to one another, a curved row of teeth results when there are a plurality of first teeth.

In one exemplary arrangement, the curved first tooth ridge and/or the curved portion of the first tooth ridge extend(s) starting from the first tooth end and starting from a maximum tooth height of the first tooth in the direction of the second tooth end. In one exemplary arrangement, the first tooth ridge has a first sub-portion having a continuously decreasing tooth height and a further sub-portion having a constant tooth height. In one exemplary arrangement, the tooth height decreases continuously in the direction of the second tooth end and in the course of the curved first tooth ridge and/or the curved portion of the first tooth ridge. In this exemplary arrangement, the curved portion, in the direction of the second tooth end, can merge into the straight portion of the first tooth ridge. The straight portion of the first tooth ridge can have a constant tooth height that corresponds to the lowest tooth height of the curved portion.

According to a further exemplary arrangement, the first latching unit can be pivoted about a tilting axis aligned transversely or at right angles to the longitudinal direction of the first teeth. This can be a tilting axis with a virtual or a real design. In one exemplary arrangement, the first latching unit can be pivoted about the tilting axis by an angle in a range of less than 10° or in a range of 5° to 10°. For realizing the pivotability of the first latching unit, it can be mounted in a suitable manner. In one exemplary arrangement, the first latching unit has a predetermined freedom of movement or play outside the interlocking latching connection with the second latching unit in order to realize the desired pivotability. As an alternative or in addition, in one exemplary arrangement, the second latching unit can be pivotable about a tilting axis aligned transversely or at right angles to the longitudinal direction of the second teeth. However, in one exemplary arrangement, the second latching unit is fixed.

In one exemplary arrangement, the second teeth of the second latching unit have a second tooth tip in each case. In this case, the second tooth tip forms a straight and/or curved second tooth ridge extending in the longitudinal direction of the second tooth. The second tooth ridge can be designed in a straight line over its entire length. Alternatively, in one exemplary arrangement, the second tooth ridge can be designed to be curved over its entire length or in one portion. In one exemplary arrangement, the curve and/or a curve radius of the second tooth ridge deviates from the curve and/or a curve radius of the first tooth. In particular, the second teeth have a single tooth ridge in each case. In one exemplary arrangement, the tooth flanks of the second tooth, in order to realize the interlocking latching connection, are designed to correspond in shape to the tooth flanks of the first tooth. In the interlocking latching connection, the tooth flanks of the second tooth therefore rest against the tooth flanks of the first tooth. In one exemplary arrangement, the first latching unit and the second latching unit are arranged to be immovable relative to one another in the effective interlocking latching connection and in a direction transverse or at right angles to the longitudinal direction of the teeth of the first latching unit and the second latching unit.

A steering apparatus for a vehicle, in particular a motor vehicle, and having a steering column, is particularly advantageous, the steering column being arranged and adjustable on a bracket, and the bracket having a latching device according to one of the exemplary arrangements of the disclosure. The steering apparatus has a steering wheel.

The steering wheel of the steering apparatus can be connected, mechanically, electromechanically, or by a steer-by-wire, to the running wheels of the vehicle. In this case, the running wheels can be moved or aligned by the steering apparatus and by turning the steering wheel. As a result, a driver or a user can control a direction of travel while the vehicle is in motion. In one exemplary arrangement, the steering column is adjustably attached to the bracket. The steering column can be adjusted in terms of inclination, height, and/or length by the adjustable bracket. This allows the position of the steering wheel to be adjusted to the height or ergonomics of the driver. The steering apparatus preferably has an adjustment mechanism. This adjustment mechanism can be used to realize the adjustment function of the adjustable bracket. In particular, the adjustment mechanism has the latching device according to the disclosure. The adjustment mechanism can have a lever, among other things. Due to the adjustment mechanism, the steering column and thus the steering wheel can be adjusted with regard to its inclination, height, and/or distance from the driver. To make adjustments, the adjustment mechanism can be released using the lever. At the same time, the latching device is released by, for example, lifting the first latching unit from the second latching unit. After the adjustment has been carried out, the adjustment mechanism is fixed or blocked by the lever. In this case, the first latching unit and the second latching unit are moved towards one another in order to realize the interlocking latching connection until the first teeth and the second teeth engage in one another. Due to the latching device according to the disclosure, a tooth-on-tooth situation that may occur is automatically resolved. This ensures that the interlocking latching connection is reliably produced.

Furthermore, a method for producing an interlocking latching connection with the latching device according to the disclosure is advantageous. In this case, the first latching unit and the second latching unit are moved towards one another with the first teeth and second teeth thereof facing one another. If a tooth-on-tooth situation occurs, initially a sub-region of the first tooth ridge abuts against a sub-region of the second tooth ridge. The tooth-on-tooth situation is then resolved by the first tooth ridge, which is curved at least in portions. The first teeth and the second teeth then engage, and in one exemplary arrangement, automatically, in an interlocking manner. Thus, the desired interlocking latching connection of the two latching units can also be implemented based on a tooth-on-tooth situation.

In the tooth-on-tooth situation, the first tooth ridge, which in one exemplary arrangement, is curved at a first tooth end of the first tooth and in the region with a maximum tooth height of the first tooth, abuts against the straight second tooth ridge at a first tooth end of the second tooth. The first latching unit is subsequently pivoted or tilted about a tilting axis aligned transversely or at right angles to the longitudinal direction of the first teeth when the movement of the first latching unit and the second latching unit towards one another is continued.

Due to the tilting of the first latching unit, a region of the first tooth ridge, which is assigned to a second tooth end of the first tooth facing away from the first tooth end, makes contact with a tooth flank of the second tooth. The first latching unit and the second latching unit are subsequently displaced transversely to the longitudinal direction of the first teeth and second teeth when the movement of the first latching unit and the second latching unit towards one another is continued. In one exemplary arrangement, the tooth flanks of the first tooth and the second tooth slide on one another in the region of the second tooth end. This resolves the tooth-on-tooth situation at the first tooth end of the first tooth and the second tooth. Thus, the first teeth and the second teeth can finally interlock in an interlocking manner in order to realize the latching connection. In particular, the first latching unit and the second latching unit are displaced in mutually opposite directions when moving transversely to the longitudinal direction of the first teeth and second teeth. In one exemplary arrangement, only the first latching unit is moved to resolve the tooth-on-tooth situation. The second latching unit can be firmly attached to the bracket. In one exemplary arrangement, the first latching unit and/or the second latching unit are designed, supported, and/or arranged with sufficient freedom of movement or play to allow for the displacement transversely to the longitudinal direction of the first teeth and second teeth. After the tooth-on-tooth situation has been resolved, the first latching unit can pivot back into its original orientation about the tilting axis. In one exemplary arrangement, the original orientation corresponds to an orientation of the first latching unit immediately before pivoting about the tilting axis to resolve the tooth-on-tooth situation.

BRIEF DESCRIPTION OF THE DRAWINGS

The disclosure is explained in more detail below with reference to the drawings. In this case, like reference signs relate to the like, similar, or functionally identical components or elements. In the drawings.

DETAILED DESCRIPTION

Figure 1:
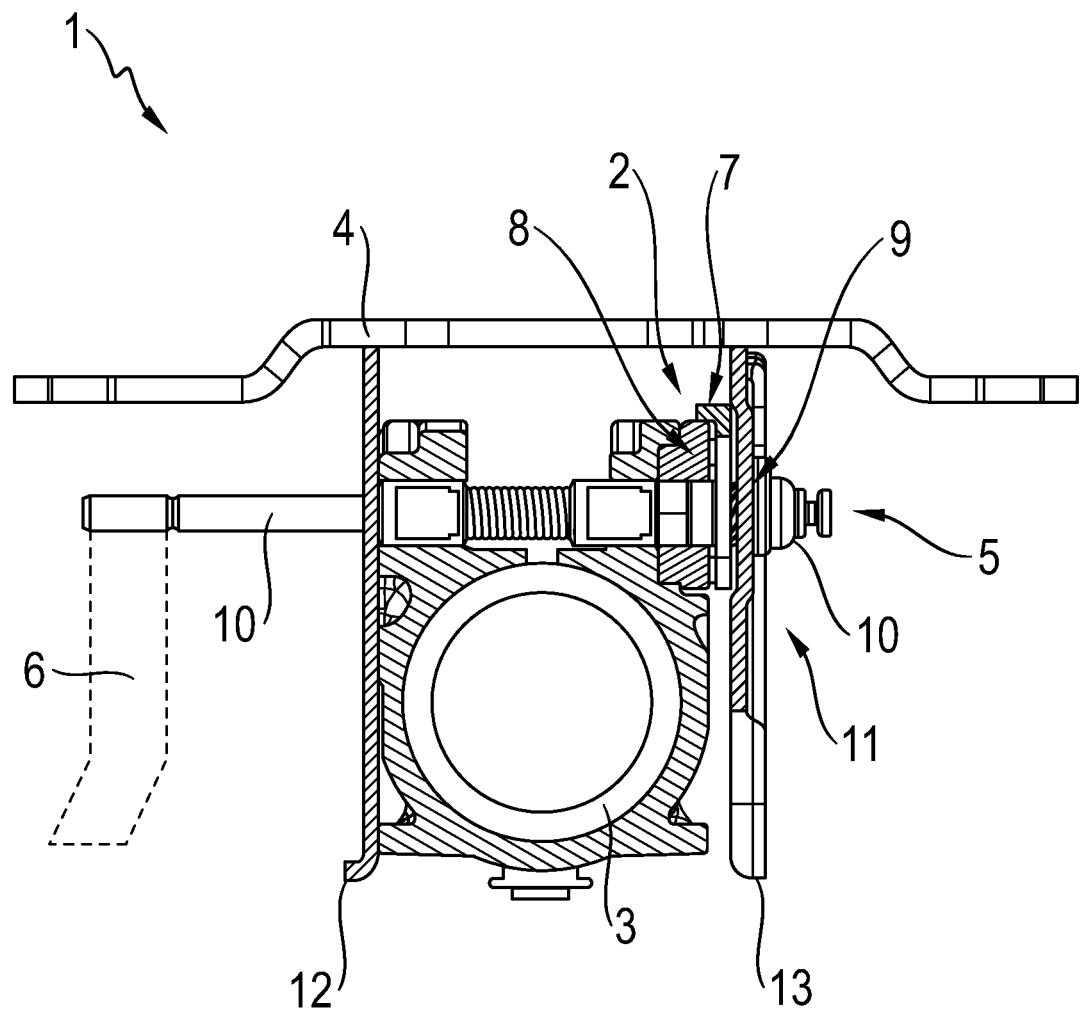
FIG. 1 is a front view of a steering apparatus having a latching device according to an exemplary arrangement of the disclosure.

FIG. 1 shows a front view of an exemplary arrangement of a steering apparatus 1 having a latching device 2 according to the disclosure. The steering apparatus 1 is designed to be arranged in a motor vehicle (not shown in detail in this case). For this purpose, the steering apparatus 1 can be arranged on a vehicle carrier (not shown in detail in this case), for example a vehicle cross member. The steering apparatus 1 has a steering column 3 (indicated in this case only schematically). At a free end of the steering column 3, a steering wheel (not shown in this case) can be or will be arranged. The steering column 3 is arranged on a bracket 4. In this case, the position of the steering column 3 and thus the position of a steering wheel connected to the steering column 3 can be adjusted. For this purpose, the steering apparatus 1 has an adjustment mechanism 5. The adjustment mechanism 5 includes, inter alia, a lever 6, which is only indicated schematically in this case. An inclination, height, and/or length of the steering column 3 can be adjusted by the adjustment mechanism 5. In order to allow for such an adjustment, the adjustment mechanism 5 or the latching device 2 is released by the lever 6. After the adjustment has been carried out, the adjustment mechanism 5 or the latching device 2 is fixed or blocked by the lever 6. The latching device 2 is thus a constituent of the adjustment mechanism 5.

The latching device 2 has a first latching unit 7. In this exemplary arrangement, the first latching unit 7 interacts on two sides facing away from one another on the one hand with a second latching unit 8 and on the other hand with a third latching unit 9. The basic structure and the mode of operation of the first latching unit 7 in interaction with the second latching unit 8 or the third latching unit 9 is described in more detail with reference to the following drawings.

In this exemplary arrangement, the adjustment mechanism 5 has an actuating rod 10. The lever 6 is arranged in the region of a first end of the actuating rod 10. A releasable fixed bearing 11 for the actuating rod 10 is arranged in the region of a second end of the actuating rod 10 facing away from the first end. The actuating rod 10 penetrates two retaining flanges 12, 13 of the bracket 4. The steering column 3 is arranged between the two retaining flanges 12, 13 and held by the actuating rod 10. In this exemplary arrangement, the actuating rod 10 also penetrates the latching units 7, 8, 9. In this case, the third latching unit 9 is designed as a constituent of the retaining flange 13.

When the adjustment mechanism 5 is released by the lever 6, the latching units 7, 8, 9 are released or lifted from one another in such a way that the steering column 3 can be adjusted. When the adjustment mechanism 5 is fixed by the lever 6, a corresponding interlocking latching connection is realized between the latching units 7, 8, 9, so that the steering column 3 is fixed in the adjusted position.

Figure 2:
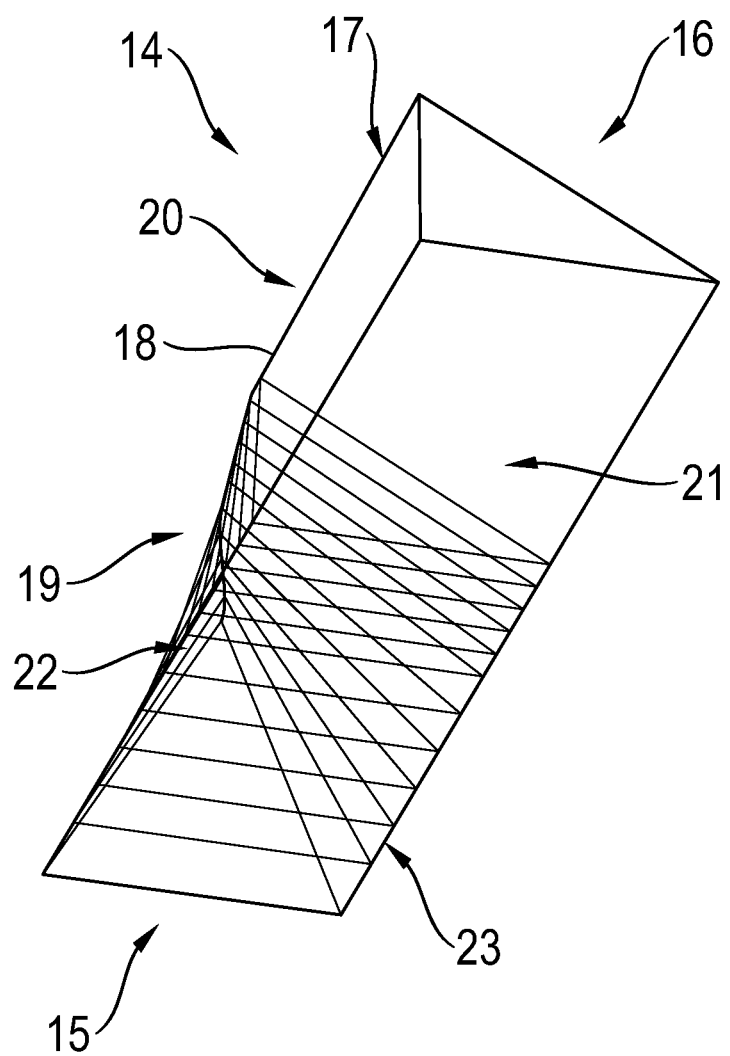
FIG. 2 is a schematic, perspective front view of a first tooth for a latching device according to an exemplary arrangement of the disclosure.

FIG. 2 shows a schematic, perspective front view of a first tooth 14 for a latching device according to an exemplary arrangement (not shown in this case), for example for a latching device 2 according to FIG. 1.

The first tooth 14 has a first tooth end 15 and a second tooth end 16 facing away from the first tooth end 15. A longitudinal direction of the first tooth 14 is produced, starting from the first tooth end 15 in the direction of the second tooth end 16. The first tooth 14 has a first tooth tip 17. The first tooth tip 17 forms a first tooth ridge 18 extending in the longitudinal direction of the first tooth 14. This first tooth ridge 18 is designed to be curved in portions in this embodiment. In this exemplary arrangement, the first tooth ridge 18 is designed to be curved in a direction transverse to the longitudinal direction of the first tooth 14. In this exemplary arrangement, the first tooth ridge 18 has a curved portion 19 and a straight portion 20.

The first tooth 14 has two tooth flanks 21, 22 arranged facing away from one another. The tooth flanks 21, 22 have a flank height in each case that results between a tooth base 23 of the first tooth 14 and the first tooth ridge 18. Starting from the first tooth end 15 in the direction of the second tooth end 16, the flank height of the first tooth flank 21 increases continuously in the region of the curved portion 19. On the other hand, starting from the first tooth end 15 in the direction of the second tooth end 16, the flank height of the second tooth flank 22 decreases continuously in the region of the curved portion 19. In addition, in the region of the curved portion 19, the angle of inclination of the tooth flanks 21, 22 changes continuously starting from the first tooth end 15 in the direction of the second tooth end 16.

Figure 3:
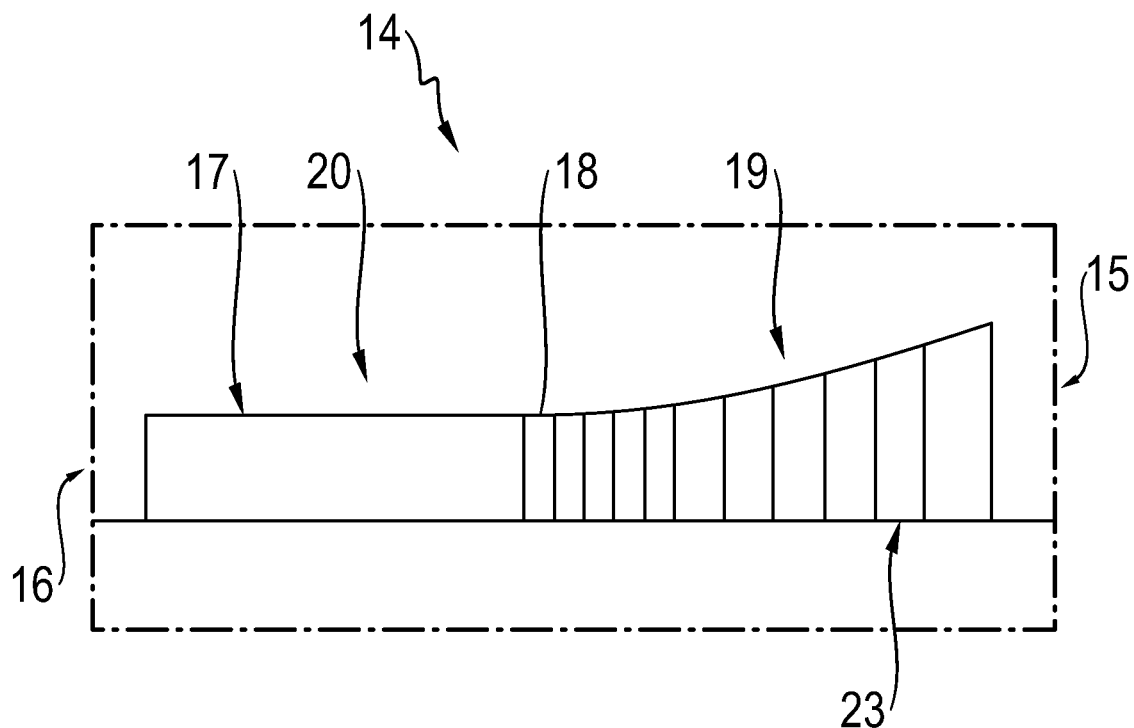
FIG. 3 is a schematic side view of the first tooth according to FIG. 2.

FIG. 3 shows a schematic side view of the first tooth 14 according to FIG. 2. The first tooth ridge 18 has a continuously decreasing tooth height starting from the first tooth end 15 in the direction of the second tooth end 16 and in the curved portion 19. Correspondingly, the first tooth 14 has a maximum tooth height in the region of the first tooth end 15. In the region of the second tooth end 16, the first tooth 14 has a minimum tooth height. In this case, the curved portion 19 merges into the straight-line portion 20, the straight-line portion having a constant tooth height which at the same time corresponds to the minimum or lowest tooth height of the curved portion 19.

Figure 4:
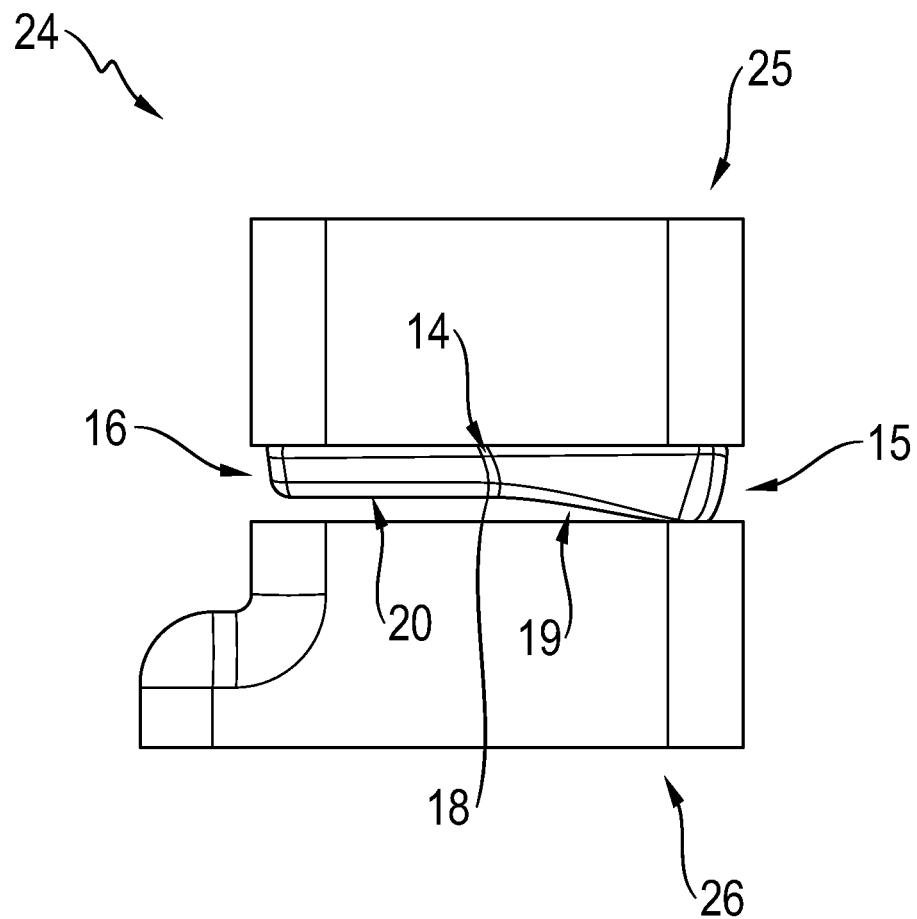
FIG. 4 is a side view of a latching device according to an exemplary arrangement of the disclosure.

FIG. 4 is a side view of a latching device 24 according to an exemplary arrangement of the disclosure. The latching device 24 has a first latching unit 25 and a second latching unit 26. The two latching units 25, 26 are designed to realize an interlocking latching connection with one another, the two latching units 25, 26 being arranged out of engagement with one another as shown in this case.

It can be seen that the first latching unit 25 has a first tooth 14. With regard to the structure of the first tooth 14 and to avoid repetition, reference is made to the preceding description of FIGS. 2 and 3.

Figure 5:
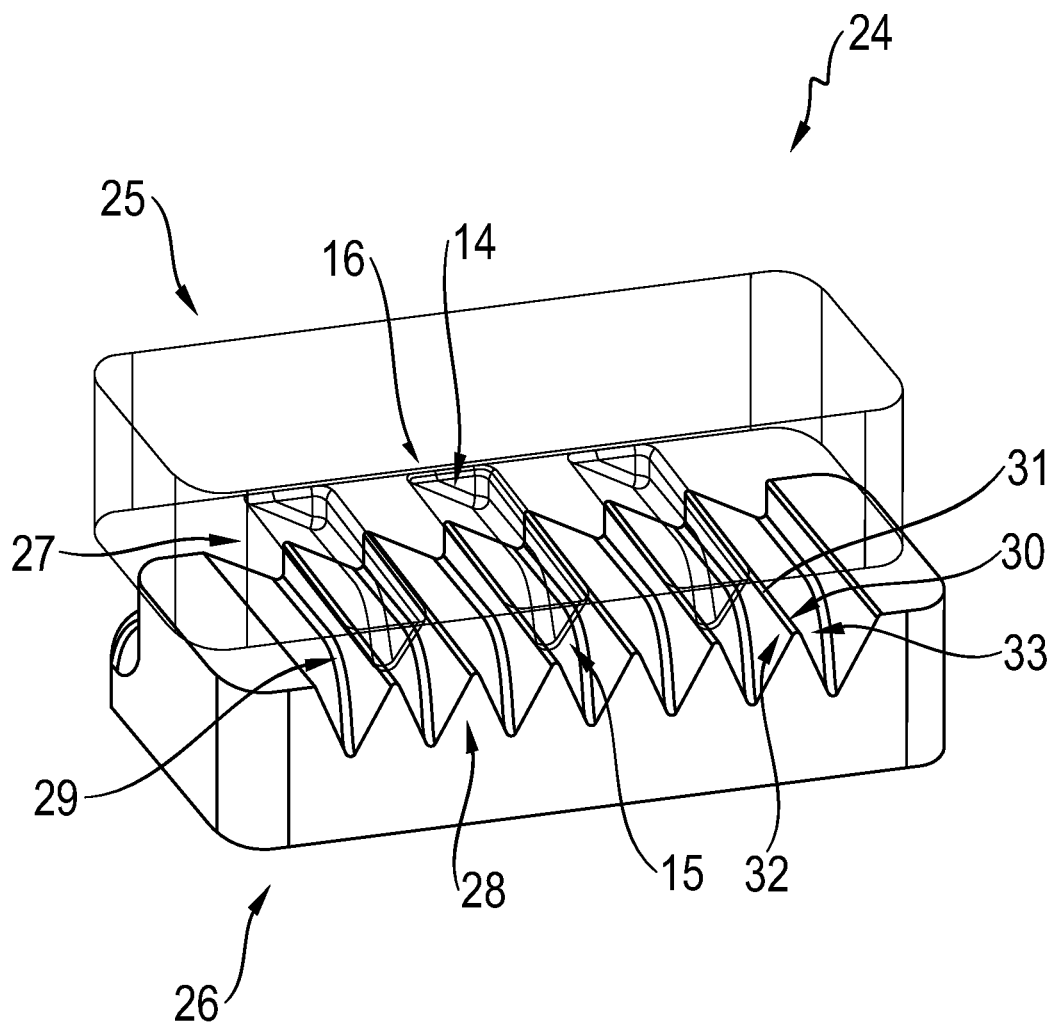
FIG. 5 is a partially transparent, perspective first front view of the latching device according to an exemplary arrangement of the disclosure according to FIG. 4.

FIG. 5 shows a partially transparent, perspective first front view of the latching device 24 according to an exemplary arrangement of the disclosure according to FIG. 4. The first latching unit 25 has a plurality of first teeth 14. As a result, the first latching unit 25 has a first row of teeth 27.

The second latching unit 26 has second teeth 28. For the sake of clarity, not all of the second teeth 28 are provided with a reference sign. The plurality of second teeth 28 of the second latching unit 26 form a second row of teeth 29. The first teeth 14 of the first latching unit 25 and the second teeth 28 of the second latching unit 26 face one another. The second teeth 28 have a second tooth tip 30 in each case. The second tooth tip 30 forms a straight second tooth ridge 31 extending in the longitudinal direction of the respective second tooth 28. The second teeth 28 have in each case two tooth flanks 32, 33 facing away from one another. The tooth flanks 32, 33 of the second tooth 28 are formed in a shape corresponding to tooth flanks 21, 22 of the first tooth 14 in order to realize the interlocking latching connection.

Figure 6:
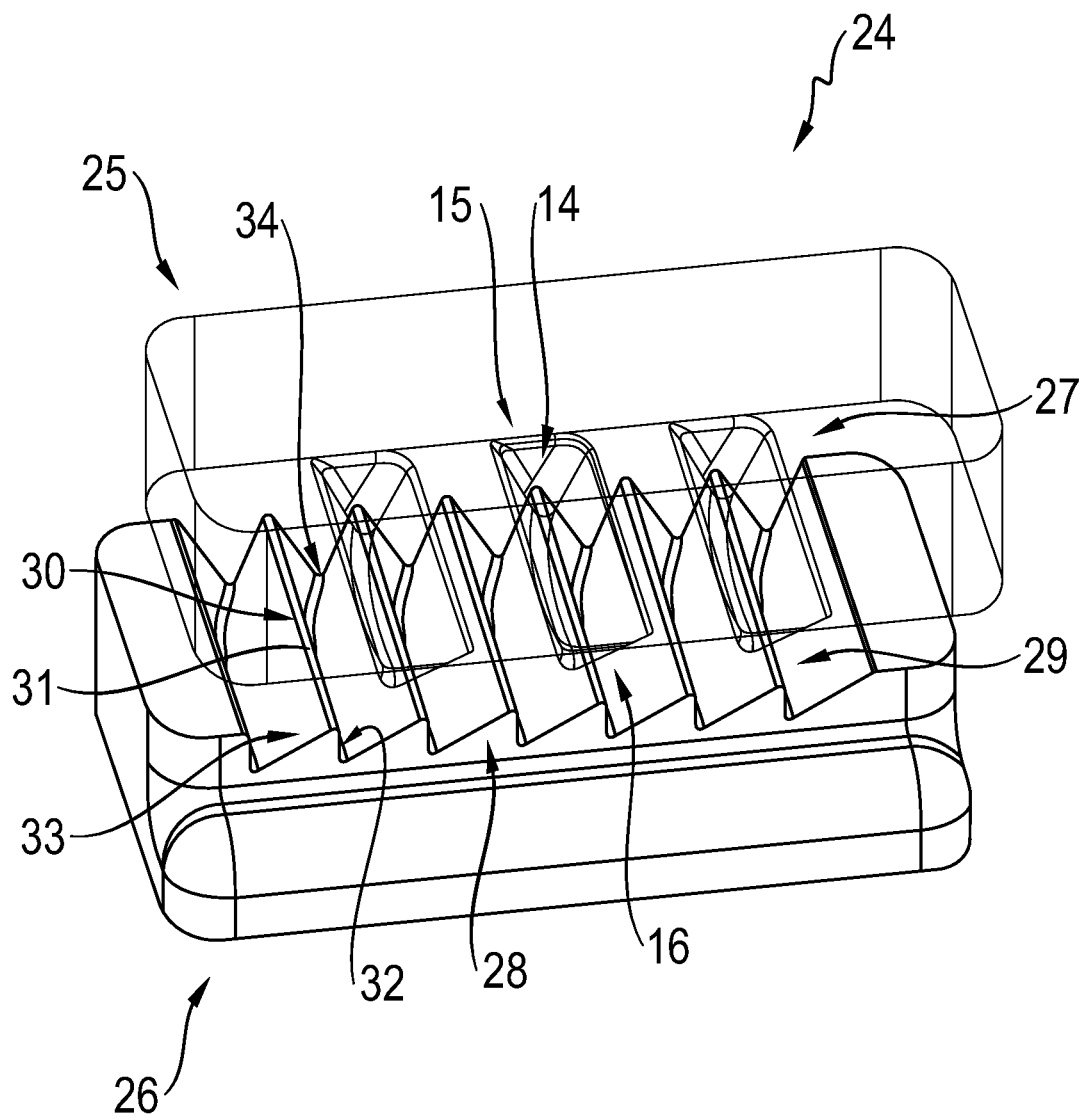
FIG. 6 is a partially transparent, perspective second front view of the latching device according to the disclosure according to FIG. 4.

FIG. 6 is a partially transparent, perspective second front view of the latching device 24 according to an exemplary arrangement of the disclosure according to FIG. 4. A tooth valley 34 is formed in each case between two second teeth 28. The tooth valley 34 is designed to be received in an interlocking manner corresponding to the course of the first tooth ridge 18 of the first teeth 14.

Figure 7:
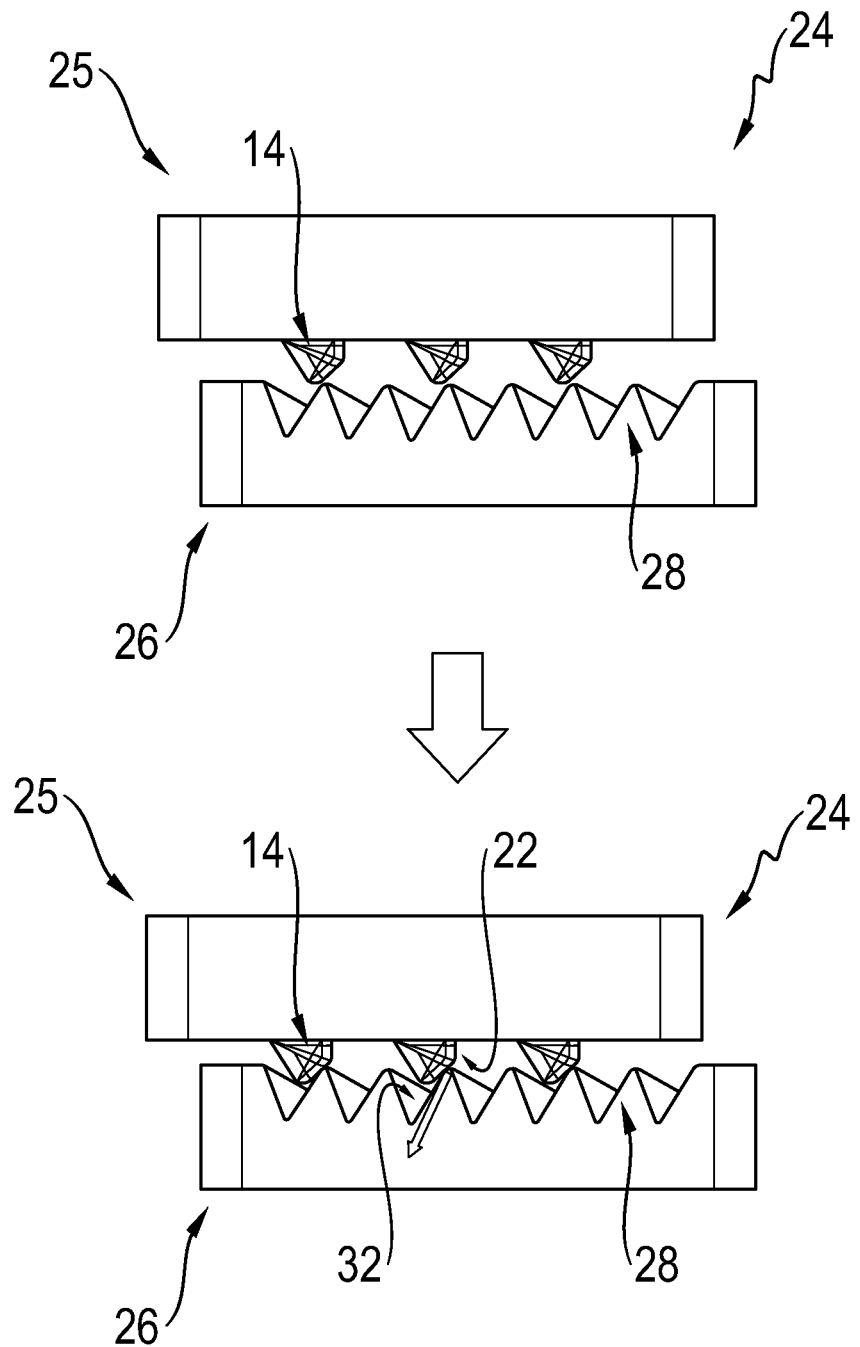
FIG. 7 is two front views of the latching device according to an exemplary arrangement of the disclosure according to FIGS. 4 to 6 with regard to the implementation of a first latching connection from a first non-tooth-on-tooth situation.

FIG. 7 shows two front views of the latching device 24 according to the disclosure according to FIGS. 4 to 6 with regard to the implementation of a first latching connection from a first non-tooth-on-tooth situation.

The upper illustration in FIG. 7 shows the latching device 24 with latching units 25, 26 spaced apart from one another. The latching units 25, 26 are arranged offset from one another in a direction transverse or at right angles to the longitudinal direction of the teeth 14, 28. Starting from the upper illustration of FIG. 7, the latching units 25, 26 are moved towards one another. Due to the non-tooth-on-tooth situation, the second tooth flank 22 of the first tooth 14 comes into contact in each case with the tooth flank 32 of the respective second tooth 28, as shown in the lower illustration in FIG. 7. Via the interaction of the tooth flanks 22, 32, the first teeth 14 and the second teeth 28 come into an interlocking latching connection with one another without any hindrance.

Figure 8:
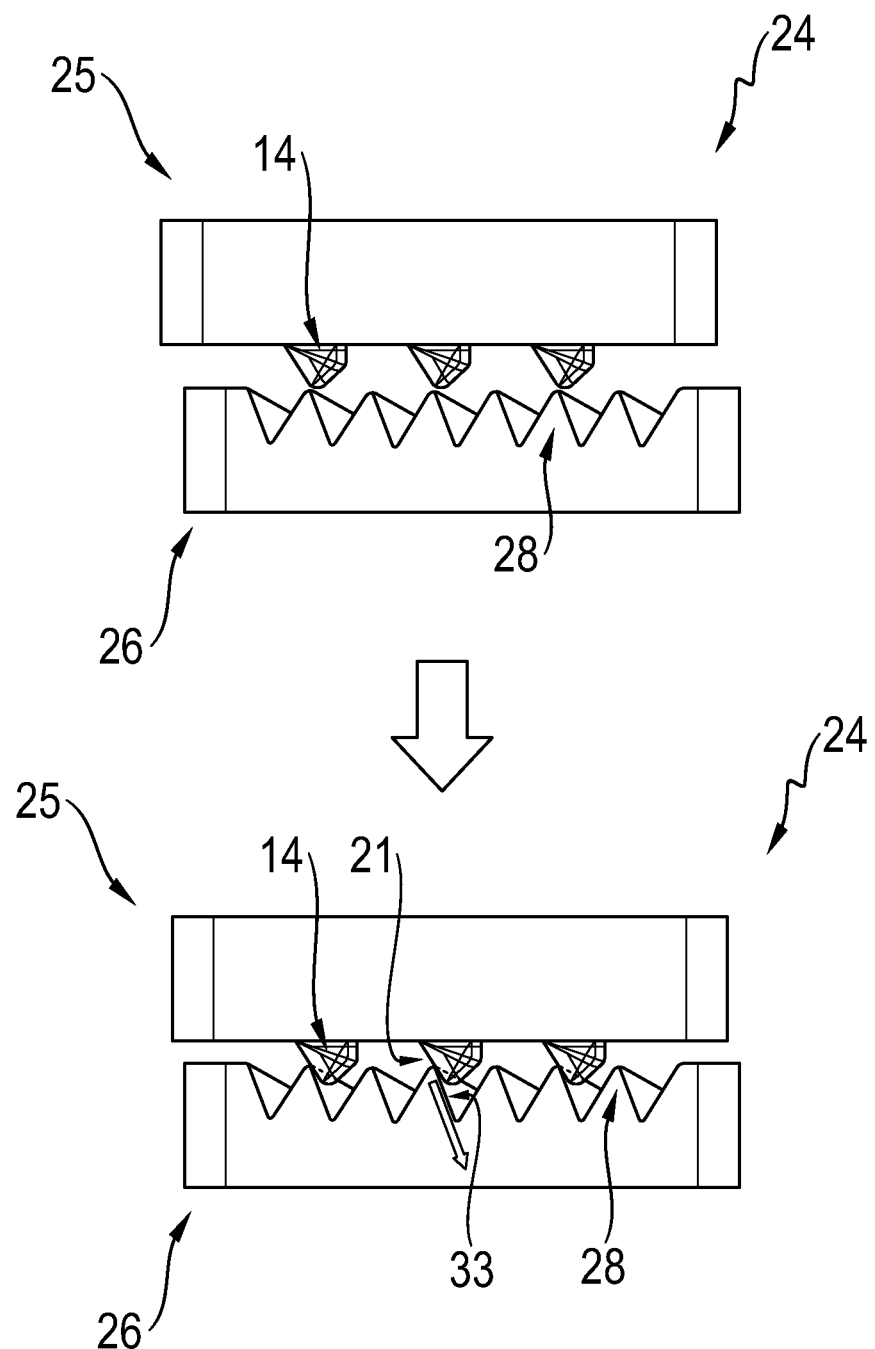
FIG. 8 is two front views of the latching device according to the disclosure according to FIG. 4 to 6 with regard to the implementation of a second latching connection from a second non-tooth-on-tooth situation.

FIG. 8 shows two front views of the latching device 24 according to the disclosure according to FIGS. 4 to 6 with regard to the implementation of a second latching connection from a second non-tooth-on-tooth situation.

The upper illustration in FIG. 8 shows the latching device 24 with latching units 25, 26 spaced apart from one another. The latching units 25, 26 are arranged offset from one another in a direction transverse or at right angles to the longitudinal direction of the teeth 14, 28. Starting from the upper illustration of FIG. 8, the latching units 25, 26 are moved towards one another. Due to the non-tooth-on-tooth situation, the second tooth flank 21 of the first tooth 14 comes into contact in each case with the tooth flank 33 of the respective second tooth 28, as shown in the lower illustration in FIG. 8. Via the interaction of the tooth flanks 21, 33, the first teeth 14 and the second teeth 28 come into an interlocking latching connection with one another without any hindrance.

Figure 9:
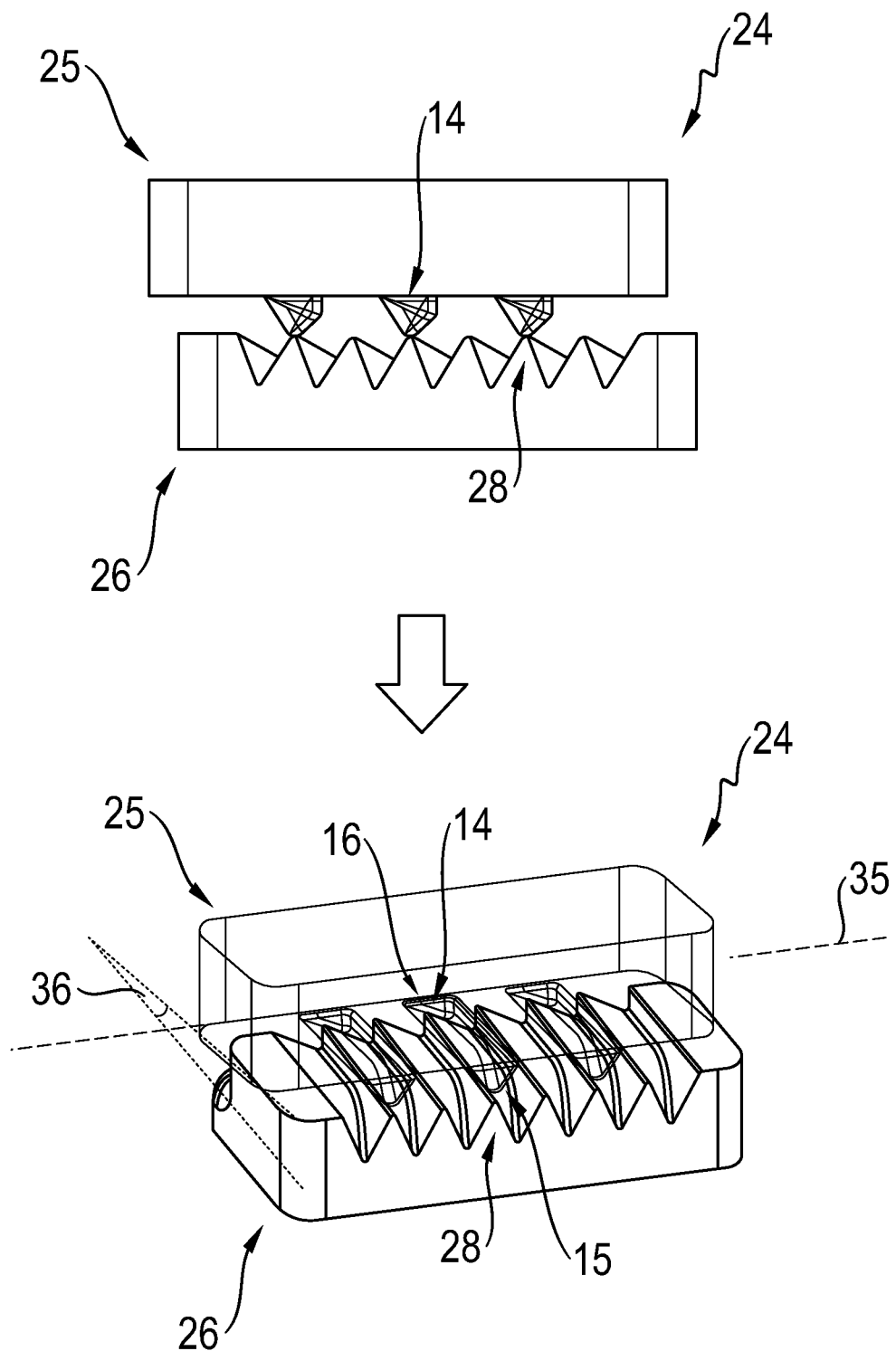
FIG. 9 is a first front view and a partially transparent, perspective first front view of the latching device according to the disclosure according to FIG. 4 to 6 with regard to the implementation of a further latching connection from a tooth-on-tooth situation.

FIG. 9 is a first front view and a partially transparent, perspective first front view of the latching device 24 according to the disclosure according to FIGS. 4 to 6 with regard to the implementation of a further latching connection from a tooth-on-tooth situation.

The upper illustration of FIG. 9 shows the first front view, wherein the first latching unit 25 and the second latching unit 26 are moved relative to one another towards one another with the first teeth 14 and second teeth 28 thereof facing one another, so that, in a tooth-on-tooth situation shown in this case, initially a sub-region of the first tooth ridge 18 abuts against a sub-region of the second tooth ridge 31. Taking into account the representation according to FIG. 4, in the tooth-on-tooth situation, the first tooth ridge 18, which is curved at the first tooth end 15 of the first tooth 14 and in the region with a maximum tooth height of the first tooth 14, abuts against the straight second tooth ridge 31 at the first tooth end of the second tooth 28.

This tooth-on-tooth situation is then resolved by the first tooth ridge 18 which is designed to be curved when the movement of the first latching unit 25 and the further latching unit 26 towards one another is subsequently continued.

According to the lower illustration in FIG. 9, the first latching unit 25 is pivoted about a tilting axis 35 aligned transversely or, in this exemplary arrangement, at right angles to the longitudinal direction of the first teeth 14 when the movement of the first latching unit 25 and the second latching unit 26 towards one another is continued. This results in a tilt angle 36 between a plane of the first latching unit 25 and a plane of the second latching unit 26. In this exemplary arrangement, this angle is in a range from 5° to 10.

Figure 10:
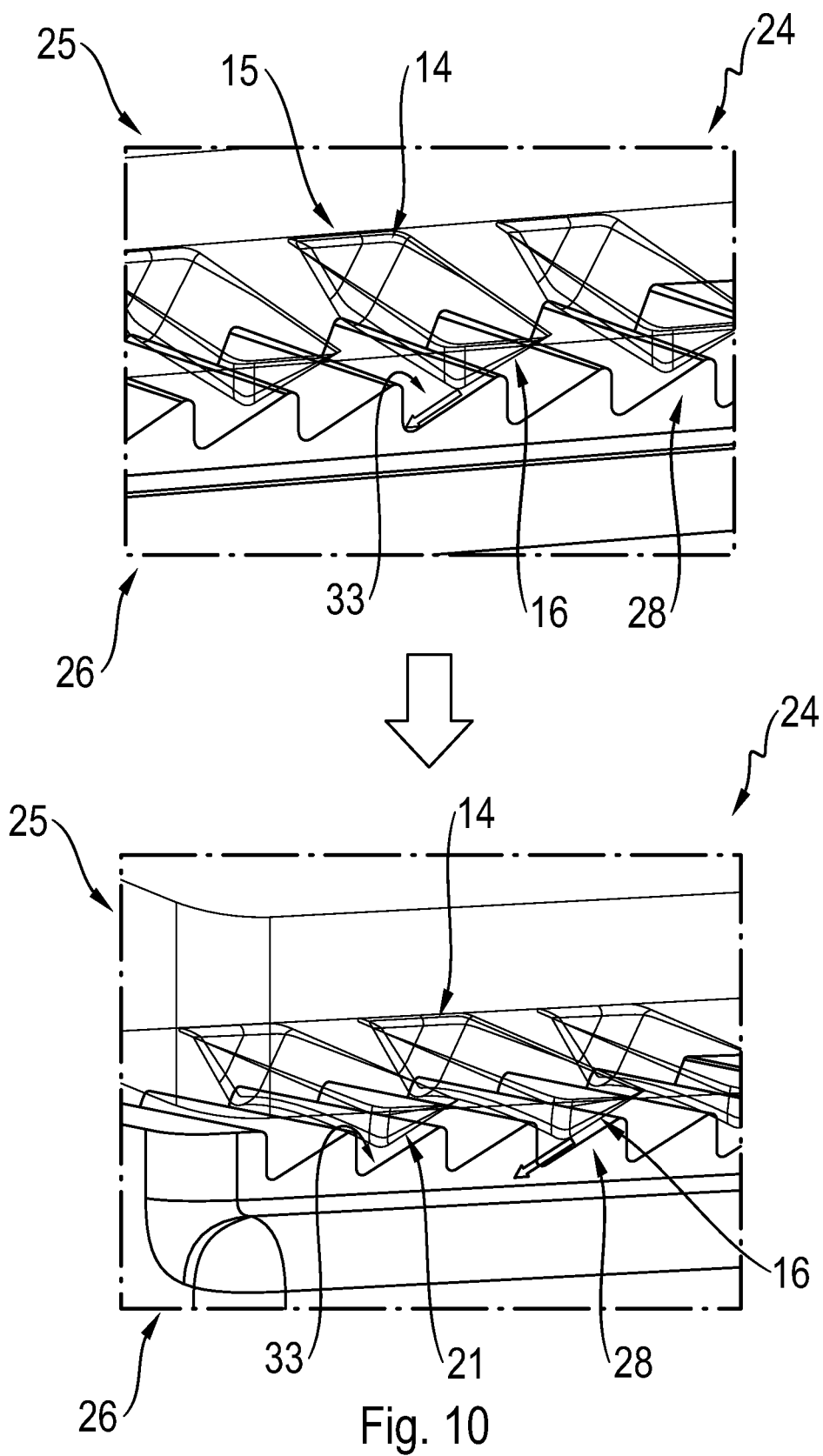
FIG. 10 is two partially transparent, perspective second front views of the latching device according to the disclosure according to FIG. 4 to 6 with regard to the implementation of the further latching connection from the tooth-on-tooth situation according to FIG. 9.

FIG. 10 is two partially transparent, perspective second front views of the latching device 24 according to the disclosure according to FIGS. 4 to 6 with regard to the implementation of the further latching connection from the tooth-on-tooth situation according to FIG. 9. Due to the pivoting or tilting of the first latching unit 25 about the tilting axis 35 according to the lower illustration in FIG. 10, a region of the first tooth ridge 18 of the first tooth 14 contacts the facing tooth flank 33 of the second tooth 28 in each case. In this case, the contacting region of the first tooth ridge 18 is assigned to the second tooth end 16 of the first tooth 14. The first latching unit 25 and the second latching unit 26 are displaced relative to one another, in particular opposite to one another, transversely to the longitudinal direction of the first teeth 14 and second teeth 28 when the movement of the first latching unit 25 and the second latching unit 26 towards one another is continued as shown in the lower illustration in FIG. 10. In this case, the first tooth flank 21 of the first tooth 14 slides on the facing tooth flank 33 of the second tooth 28.

Figure 11:
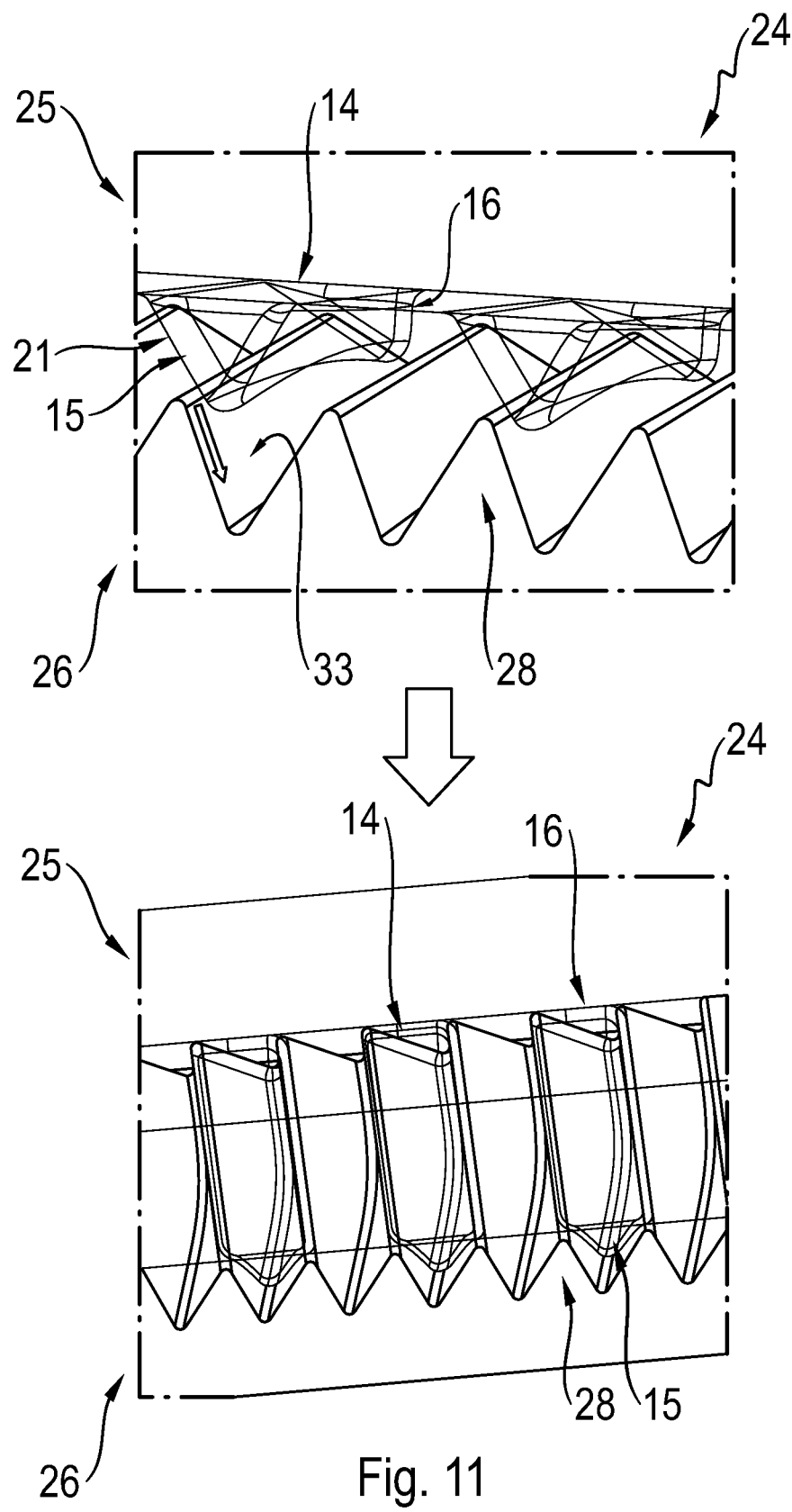
FIG. 11 is two partially transparent, perspective further first front views of the latching device according to the disclosure according to FIG. 4 to 6 with regard to the implementation of the further latching connection from the tooth-on-tooth situation according to FIG. 9.

FIG. 11 is two partially transparent, perspective further first front views of the latching device 24 according to the disclosure according to FIGS. 4 to 6 with regard to the implementation of the further latching connection from the tooth-on-tooth situation according to FIG. 9. In this case, the upper illustration in FIG. 11 shows the same situation as the lower illustration in FIG. 10, but in this case with a view of the first tooth end 15. It can be seen that due to the sliding along the first tooth ridge 18 or the first tooth flank 21 of the first tooth 14 on the tooth flank 33 in the region of the second tooth end 16, the tooth-on-tooth situation in the region of the first tooth end 15 is resolved and the first teeth 14 and the second teeth 28 engage in an interlocking manner when the movement of the first latching unit 25 and the further latching unit 26 towards one another is continued.

This results in the desired interlocking latching connection between the first latching unit 25 and the second latching unit 26, as shown in the lower illustration in FIG. 11. In this end position, in this exemplary arrangement, the first latching unit 25 is pivoted after the tooth-on-tooth situation is resolved back to its original orientation about the tilting axis 35 according to the lower illustration in FIG. 9.

The first latching unit 7 according to FIG. 1 is designed in the sense of the first latching unit 25 according to FIGS. 4 to 11. The second latching unit 8 and the third latching unit 9 according to FIG. 1 are each designed in each case in the sense of the second latching unit 26 according to FIGS. 4 to 11.

The invention claimed is:

1. A latching device having a first latching unit and having at least one second latching unit, wherein first teeth of the first latching unit are formed in order to realize an interlocking latching connection with second teeth of the second latching unit, and the first teeth of the first latching unit have a first tooth tip in each case, wherein the first tooth tip forms a first tooth ridge extending in a longitudinal direction of the first tooth, wherein the first tooth ridge is designed to be curved in a direction transverse to the longitudinal direction of the first tooth, wherein the first tooth ridge has a curved portion and a straight portion.

2. The latching device according to claim 1, wherein the first tooth ridge has a continuously, decreasing tooth height at least in the curved portions in the longitudinal direction of the first tooth and starting from a first tooth end of the first tooth in the direction of a second tooth end of the first tooth facing away from the first tooth end.

3. The latching device according to claim 1, wherein the curved first tooth ridge and/or the curved portion of the first tooth ridge extend(s) starting from the first tooth end and starting from a maximum tooth height of the first tooth in a direction of a second tooth end, the tooth height decreasing continuously in the direction of the second tooth end and in the course of the curved first tooth ridge and/or the curved portion of the first tooth ridge merges into the straight portion of the first tooth ridge, wherein the straight portion has a constant tooth height that corresponds to the lowest tooth height of the curved portion.

4. The latching device according to claim 1, wherein the second teeth of the second latching unit have a second tooth tip in each case, the second tooth tip forming a straight and/or curved second tooth ridge extending in the longitudinal direction of the second tooth, wherein tooth flanks of the second tooth are formed in a shape corresponding to tooth flanks of the first tooth in order to realize the interlocking latching connection.

5. The latching device of claim 4, wherein the tooth flanks of the first tooth each have a flank height that results between a tooth base of the first tooth and the first tooth ridge, and wherein the flank height of a first tooth flank of the tooth flanks of the first tooth increases continuously in the curved portion.

6. A steering apparatus for a vehicle and having a steering column, the steering column being arranged and adjustable on a bracket, and the bracket having a latching device according to claim 1.

7. The steering apparatus of claim 6, further comprising an adjustment mechanism, wherein the adjustment mechanism further comprises a lever and an actuating rod.

8. The steering apparatus of claim 7, wherein the lever is arranged on a first end of the actuating rod.

9. The steering apparatus of claim 8, further comprising a releaseable fixed bearing for the actuating rod, the bearing being arranged on a second end of the actuating rod.

10. The steering apparatus of claim 7, wherein the actuating rod penetrates two retaining flanges of the bracket and the steering column is arranged between the two retaining flanges.

11. The steering apparatus of claim 7, wherein the actuating rod penetrates the first and second latching units.

12. The latching device of claim 1, further comprising a third latching unit, wherein the first latching unit interacts with the third latching unit in addition to the second latching unit.

13. The latching device of claim 1, wherein the first teeth of the first latching unit form a first row of teeth.

14. The latching device of claim 13, wherein the second teeth of the second latching unit form a second row of teeth.

15. The latching device of claim 13, wherein the first row of teeth extend transversely to the longitudinal direction of the first tooth.

16. A method for producing an interlocking latching connection with a latching device, wherein a first latching unit and a second latching unit are moved towards one another with first teeth of the first latching unit and second teeth of the second latching unit facing one another, wherein, in a tooth-on-tooth situation, initially a sub-region of a first tooth ridge abuts against a sub-region of second tooth ridge, and then the tooth-on-tooth situation is resolved by the first tooth ridge, which is curved which is curved at least in portions at a first tooth end of the first tooth and in a region with a maximum tooth height of the first tooth, abuts against a straight second tooth ridge at a first tooth end of the second tooth, and the first latching unit is pivoted about a tilting axis aligned transversely or at right angles to the longitudinal direction of the first teeth when movement of the first latching unit and the second latching unit towards one another is continued and then the first teeth and the second teeth engage in an interlocking manner.

17. A method according to claim 16, wherein, due to the pivoting of the first latching unit, a region of the first tooth ridge, which is assigned to a second tooth end of the first tooth facing away from the first tooth end, makes contact with a tooth flank of the second tooth, the first latching unit and the second latching unit being displaced relative to one another transversely to the longitudinal direction of the first teeth and the second teeth when the movement of the first latching unit and the second latching unit towards one another is continued, whereby the tooth-on-tooth situation at a first tooth end of the first tooth and second tooth is dissolved, and subsequently the first teeth and the second teeth engage in an interlocking manner, the first latching unit pivots after the tooth-on-tooth situation is resolved back to its original orientation about the tilting axis.

18. A latching device having a first latching unit and having at least one second latching unit, wherein first teeth of the first latching unit are formed in order to realize an interlocking latching connection with second teeth of the second latching unit, and the first teeth of the first latching unit have a first tooth tip in each case, wherein the first tooth tip forms a first tooth ridge extending in a longitudinal direction of the first tooth, wherein the first tooth ridge is designed to be curved at least in portions, wherein the first latching unit can be pivoted about a tilting axis aligned transversely or at right angles to the longitudinal direction of the first teeth.

* * * * *